(No Model.)

C. A. RAGGIO.
CASK STOPPER.

No. 248,882.              Patented Nov. 1, 1881.

Witnesses
Wm Zimmerman
Otto L. Johnson

Inventor.
Charles A. Raggio.
By Gridley & Co.
Attys.

UNITED STATES PATENT OFFICE.

CHARLES A. RAGGIO, OF CHICAGO, ILLINOIS.

CASK-STOPPER.

SPECIFICATION forming part of Letters Patent No. 248,882, dated November 1, 1881.

Application filed January 7, 1881. (No model.)

*To all whom it may concern:*

Be it known that I, CHARLES A. RAGGIO, of Chicago, in the county of Cook and State of Illinois, have invented certain new and useful Improvements in Cask-Stoppers; and I hereby declare the following to be a full, clear, and exact description thereof, which will enable others skilled in the art to which my invention appertains to make and use the same, reference being had to the accompanying drawings, in which—

Figure 1:
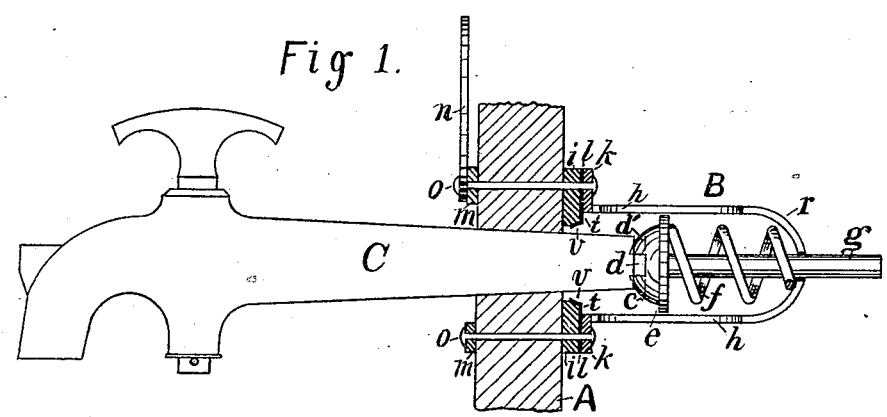
Figure 2:
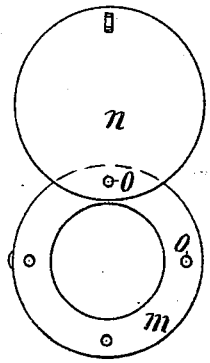

Figure 1 represents my improved cask-stopper, with the shell $r$ and rings $i$ and $m$ and part of the cask shown in section, and the valve $c$ raised from its seat by means of a faucet-stem inserted into the cask. Fig. 2 represents a front view of the ring $m$ with its attached lid $n$.

Like letters of reference indicate like parts.

My invention relates to that class of cask-stoppers which are arranged wholly on the interior of the cask and permanently attached thereto, and which open from the inside by inserting a faucet through the spigot-hole of the cask.

In the drawings, A represents the cask; B, the cask-stopper, and C a faucet inserted into the cask, and holding the valve $c$ open. The valve $c$ is inclosed within and operates in a shell, $r$, provided with an annular flange, $k$.

Under the flange $k$, and concentric therewith, on its exterior circumference, is placed an annular ring, $i$, the interior circumference of which is made smaller than the bore of the shell $r$, and which thereby forms a shoulder, $t$, against which rests the shoulder $e$ of the valve $c$. The side $v$ of the interior circumference of the ring $i$ is made concave, and so as to fit the spherical-shaped valve $c$.

Between the annular flange $k$ and ring $i$ is placed an annular ring of thin rubber or equivalent material, $l$, and which is made wide enough to allow its interior edge to cover the concave interior circumference, $v$, of the ring $i$.

The valve $c$ is provided with channels $d$ and $d'$, cut at right angles to each other on its face, as shown, the spherical part of the valve being made of a size so as just to fit the opening of the ring $i$, with the packing $l$ between it and the ring $i$, and so as to allow the shoulder $e$ of the valve at the same time, when closed, to rest on the rubber covering the shoulder $t$. The valve $c$ is provided with a stem, $g$, which passes through the center of the dome-shaped top of the shell $r$, which forms a guide for it, and at the same time a rest, against which the spring $f$ presses with one end, the other end thereof resting upon the top of the valve.

Through the shell $r$ are cut a series of slots, $h$, to allow the liquid to flow when the valve is opened.

On the outside of the cask is placed an annular ring, $m$, provided with a lid, $n$, the axis of which is made concentric with the valve and its attachments on the interior, and concentric with the axis is bored a hole of desired size through the stave of the cask, into which the stem of a faucet, C, is inserted, and in which it is held.

The stopper B is attached to the inner side of a stave, preferably before the cask is built, a fluid-tight seat being provided for the ring $i$, upon which is then placed the rubber ring $l$, and upon the top of which is placed the shell $r$, provided with the valve $c$ and its operating parts, and upon the outside of the cask is placed the ring $m$, provided with its lid $n$, and when all the parts are placed as shown and described they are permanently attached to the cask and united to each other by a series of bolts or rivets, $o$.

Having thus described my invention, what I claim as new, and desire to secure by Letters Patent, is—

1. A cask-stopper consisting of a shell, $r$, provided with the exterior flange, $k$, and longitudinal side openings, $h$, arranged wholly upon the interior of the cask, and within which is placed a valve, $c$, provided with hemispherical face, in which are cut channels $d$ $d'$, and provided with a stem, $g$, and spring $f$, arranged to work within the shell $r$ and upon the annular ring $i$.

2. A cask-stopper consisting of a shell, $r$, provided with the exterior flange, $k$, and longitudinal side openings, $h$, a valve, $c$, provided with channeled hemispherical face and a stem, $g$, and spring $f$, arranged to work within said shell and upon the exterior annular ring, $i$, in combination with a cask, A, and faucet C, substantially as shown and described.

3. A cask-stopper consisting of a shell, $r$, provided with exterior flange, $k$, and longitudinal side openings, $h$, in which is placed a valve, $e$, provided with a channeled hemispherical face, stem $g$, and spring $f$, in combination with the annular ring $i$, provided with valve-seat $v$, constructed and operated substantially as shown and described.

CHARLES A. RAGGIO.

Witnesses:
 N. COWLES,
 WM. ZIMMERMAN.